(12) United States Patent
Faulkner et al.

(10) Patent No.: US 7,149,067 B2
(45) Date of Patent: Dec. 12, 2006

(54) AUTOMATIC VOLTAGE DEVICE AND NETWORK PROTECTOR INCORPORATING SAME

(75) Inventors: Mark A. Faulkner, Greenwood, SC (US); Ronald T. Zipagan, Greenwood, SC (US)

(73) Assignee: Eaton Corportion, Cleveland, OH (US)

( * ) Notice: Subject to any disclaimer, the term of this patent is extended or adjusted under 35 U.S.C. 154(b) by 375 days.

(21) Appl. No.: 10/740,187

(22) Filed: Dec. 18, 2003

(65) Prior Publication Data
US 2005/0135032 A1 Jun. 23, 2005

(51) Int. Cl.
*H02H 3/20* (2006.01)
(52) U.S. Cl. ........................................ 361/90
(58) Field of Classification Search ................. 361/90, 361/64, 93.2
See application file for complete search history.

(56) References Cited

U.S. PATENT DOCUMENTS

| | | | |
|---|---|---|---|
| 3,947,728 A | * | 3/1976 | Smith ........................... 361/76 |
| 4,067,054 A | | 1/1978 | Clark |
| 4,631,625 A | * | 12/1986 | Alexander et al. ............. 361/94 |
| 4,713,608 A | * | 12/1987 | Catiller et al. ............... 324/142 |
| 5,179,291 A | * | 1/1993 | Nishikawa et al. .......... 307/139 |
| 5,514,964 A | * | 5/1996 | Benesh et al. ............... 342/509 |
| 6,459,554 B1 | | 10/2002 | Meiners et al. |

* cited by examiner

*Primary Examiner*—Brian Sinead
*Assistant Examiner*—Lucy Thomas
(74) *Attorney, Agent, or Firm*—Martin J. Moran

(57) ABSTRACT

A voltage sensing device automatically scales the source and network phase voltages of a power distribution system having one of two operating voltages for input to a network protector relay and also automatically scales a voltage for operating the trip and close circuit of the circuit breaker in the network protector. A latching tap select relay only switches the system voltages to the lower operating voltage input taps of step down transformers after a short delay if all the system voltages are in the lower operating range. A diagnostic circuit verifies proper switch position and voltages before closing output contacts to connect the scaled voltages to the relay and circuit breaker.

20 Claims, 3 Drawing Sheets

AUTOMATIC VOLTAGE DEVICE AND NETWORK PROTECTOR INCORPORATING SAME

BACKGROUND OF THE INVENTION

1. Field of the Invention

The invention relates to a network protector for use with power distribution systems having one of two generating voltages, and more particularly to a voltage device that in either case automatically scales the source and network phase voltages to the operating range of the network protector relay.

2. Background Information

A low voltage secondary power distribution network consists of interlaced loops or grids supplied by two or more sources of power so that the loss of any one source will not result in an interruption of power. Such networks provide a high level of reliability, and hence, are widely used to supply power to high density load areas such as a section of a city, a large building, or an industrial site.

Each source supplying power to the network is a medium voltage multi-phase feeder consisting of a multi-phase bus, a switch and a step down transformer. A network protector connects the multi-phase network to the multi-phase feeder and consists of a circuit breaker and a control relay. The control relay senses the network and source voltages in addition to the line currents and execute algorithms to initiate breaker tripping and closing actions.

The network voltage depends upon the particular installation. Two common operating voltages are 216Y/125 and 480Y/277. Control wiring and electrical apparatus inside the network protector are adapted for the system voltage. This adds complexity to the design and manufacture of network protectors and does not allow flexibility if a change in product occurs. In addition, most utilities have networks operating at each of these system voltages. This requires them to stock and service network protectors for each of these common system voltages.

One approach to resolving this situation was to make the voltage selectable and create a special control scheme for those customers who desire this feature. This approach has been very popular with utilities; however, in order to do this, a special selector switch, additional potential transformers and a control power transformer has to be installed. The switch is an expensive addition to the product, and the wiring to achieve this is complex and time-consuming, making standardization of the dual voltage selection undesirable unless requested. It also requires manual selection of the system voltage, which could result in damage to the wiring if the incorrect setting were selected.

There is room, therefore, for improvement in network protectors and in particular the voltage devices providing representations of system voltage to the control relay of the network protector.

SUMMARY OF THE INVENTION

This invention is directed to a voltage device that automatically provides representations of the source phase voltages and network phase voltages having the proper operating value regardless of the operating voltage of the system. More particularly, the invention is directed to a network protector protecting a network having three network phase voltages at a connection to a source having three source phase voltages all of which may have first or second operating values. The network protector comprises a circuit breaker selectively connecting the three network phase voltages to the three source phase voltages, a network protector relay controlling operation of the circuit breaker in response to voltages corresponding to and having a third operating value proportional to the three network phase voltages and three source phase voltages, and a voltage device automatically generating from the three source phase voltages and three network phase voltages having either the first or the second operating values, three scaled source phase voltages and three scaled network phase voltages proportional to the three source phase voltages and three network phase voltages and having the third operating value. In one embodiment, the first operating value is greater than the second operating value and the third operating value is substantially equal to the second operating value.

The voltage device comprises step down transformer means with first and second input taps and output taps converting the source and network phase voltages having the first operating value connected to the first input taps into the scaled source and network phase voltages at the output taps having the third operating value. This step down transformer means also converts source and network phase voltages having the second operating value applied to the second input taps into scaled source network phase voltages at the output taps having the third operating value. The voltage device further comprises an input switching device selectively connecting the three source phase voltages and the three network phase voltages to either the first input taps or the second input taps, and control means determining the operating value of the three source and three network phase voltages, and operating the input switch device to connect the three source and three network phase voltages to the second input taps when all three of the source and all three of the network phase voltages have the second operating value and to the first input taps otherwise. The control means further comprises delay means delaying switching of the input device for a time interval after power up. The input switching device is a latching relay device that maintains connection of the source and network phase voltages to the input taps of the step down transformer means commanded by the control means until redirected by the control means.

In a three phase distribution system there are six step down transformers and six input switches which under the operation of the control means connect the three source phase voltages and three network phase voltages to the first or second inputs of the step down transformers.

The control means also includes output switches between the output taps of the step down transformers and the network protector relay. Diagnostic means monitors the scaled source and network phase voltages and operates the output switch means to connect the output taps to the network protector relay only when all of the scaled source and network phase voltages are of the third operating value. The diagnostic means can also monitor operation of the input switch device and the source and network phase voltages and operate the output switch device only when the position of the switching device means is compatible with the source and network phase voltages.

The voltage device can also comprise a control step down transformer with first and second input taps and an output tap converting a voltage of the first operating value applied to the first input tap and a voltage of the second operating value applied to the second input tap to a control voltage of a fourth operating value at the output tap for operating the circuit breaker. The control switch selectively connects one of the three source phase voltages and the three network phase voltages to one of the first input taps and the second input tap of the control step down transformer and the control means operates the control switch to connect the one of the source and network phase voltages having the first operating value to the first input tap of the control step down transformer and to connect the one source and network phase voltage having the second operating value to the second input tap of the control step down transformer. The diagnostic means can also monitor the control voltage output by the control step down transformer and to close an output control switch to provide the control voltage to the circuit breaker only when the control voltage has the fourth operating value, which can equal the third operating value.

In accordance with another aspect of the invention, a voltage device for automatically generating for a network protector relay scaled source phase voltages and scaled network phase voltages from source phase voltages and network phase voltages of a power distribution system that can have either a first operating value or a second operating value. This voltage device comprises six step down transformers each having a first input tap, a second input tap and an output and each converting a voltage of the first operating value applied to the first input tap into a voltage of the third operating value at the output tap and converting the voltage of the second operating value applied to the second input tap into a voltage of the third operating value at the output tap. The voltage device further comprises six input switches each selectively connecting one of the three source phase voltages or one of the three network phase voltages to the first input or the second input of one of the six step down transformers. Control means determines the operating value of the three source phase voltages and three network phase voltages and operates the six input switches to connect the three source phase voltages and three network phase voltages to the second input taps of the control step down transformer when all three of the source phase voltages and all three of the network phase voltages have the second operating value, and to the first input taps otherwise.

The control means can comprise a comparator comparing the three source phase voltages and three network phase voltages with a voltage reference that is less than the first nominal amplitude but greater than the second nominal amplitude and operating the six input switches to connect the source phase voltages and network phase voltages to the second inputs of the six step down transformers only when the three source phase voltages and three network phase voltages are less than the reference voltage.

The control means can further comprise six output switches selectively outputting voltages at the output taps of the six step down transformers, and the diagnostic circuit closing the output switches only when all representative source and network phase voltages have the third nominal value.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
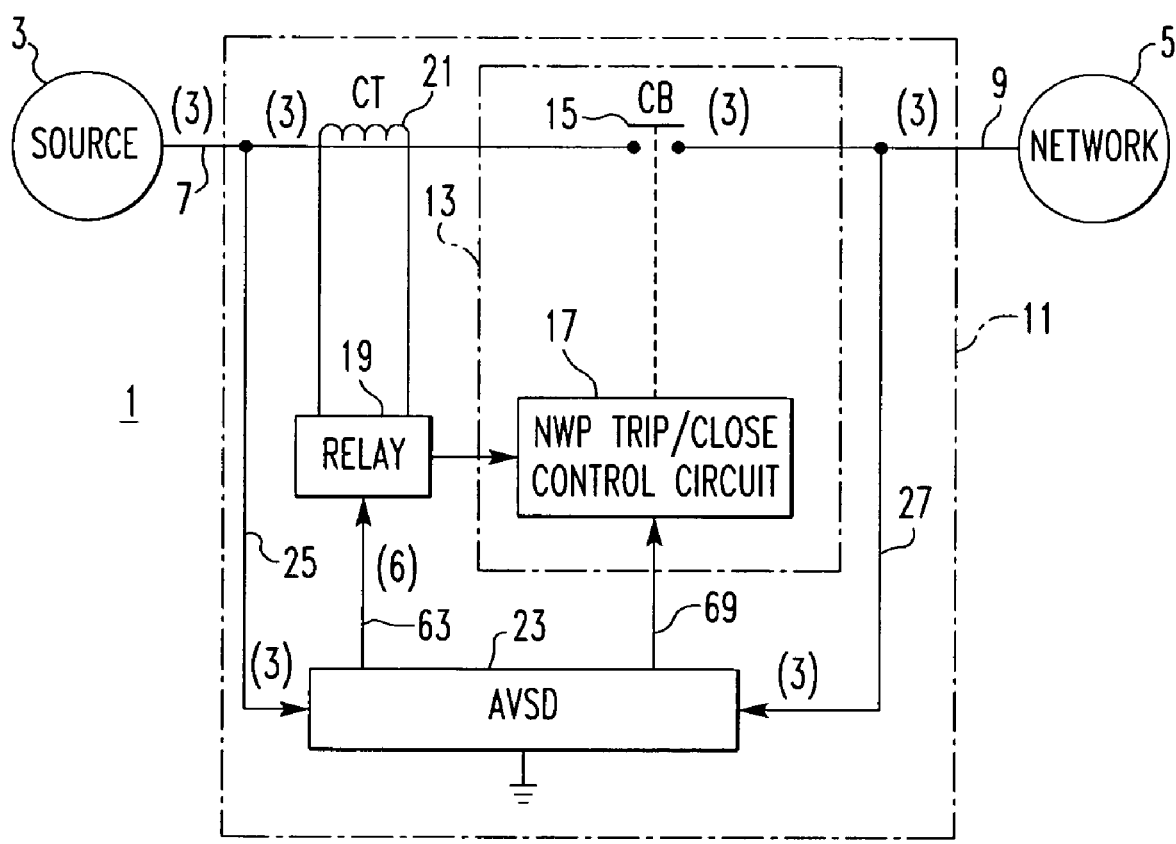
FIG. 1 is a schematic block diagram of a network protector in accordance with the invention.

FIG. 1 illustrates schematically a portion of an electric power distribution system 1 in which a source 3 provides power to a network 5. The distribution system is three phase so that the source side and the network side each have three phase conductors 7 and 9, respectively, as indicated by the numerals "3" in parentheses adjacent the conductors in the single line drawing.

A network protector 11 connects the network 5 to the source 3 and provides protection for the network. This network protector 11 includes a circuit breaker 13 having separable contacts 15 connecting the source and network conductors 7 and 9 in each of the three phases. The separable contacts 15 are opened and closed by the network protector trip/close control circuit 17, which in turn is controlled by a network protector relay 19. Current transformers 21 sense the three phase currents passing through the separable contacts 15 for use by the control relay 19. If the relay 19 senses that current is flowing out of the network toward the source rather into the network, a trip signal is sent to the network protector trip/close control circuit 17 to open the separable contacts 15.

The relay 19 also monitors the three source phase voltages and the three network phase voltages. However, as these voltages could have different operating values depending upon the installation an automatic voltage sensing device 23 is provided to scale these phase voltages to a single operating value selected for the relay 19. By operating value it is meant the design system voltage. The voltages can deviate from this nominal voltage such as during sags, swells and other transients. The exemplary automatic voltage sensing device 23 is adapted for use of the network protector 11 with power distribution systems having operating voltages of 216Y/125 and 480Y/277.

The automatic voltage sensing device (AVSD) 23 receives the source phase voltages over the leads 25 and the work phase voltages over the leads 27. As will be seen, the AVSD 23 scales the source and network phase voltages to scaled source and phase voltages having the operating value for which the relay 19 is designed. In the exemplary network protector 11 this is 125 volts, which of course is the line to ground voltage for the 216Y/125 operating voltage.

The network protector relay 19 uses the scaled source and network phase voltages in several ways. For instance, the source and network phase voltages must be in phase before the circuit breaker will close the separable contacts 15 to interconnect the two systems.

Figure 2:
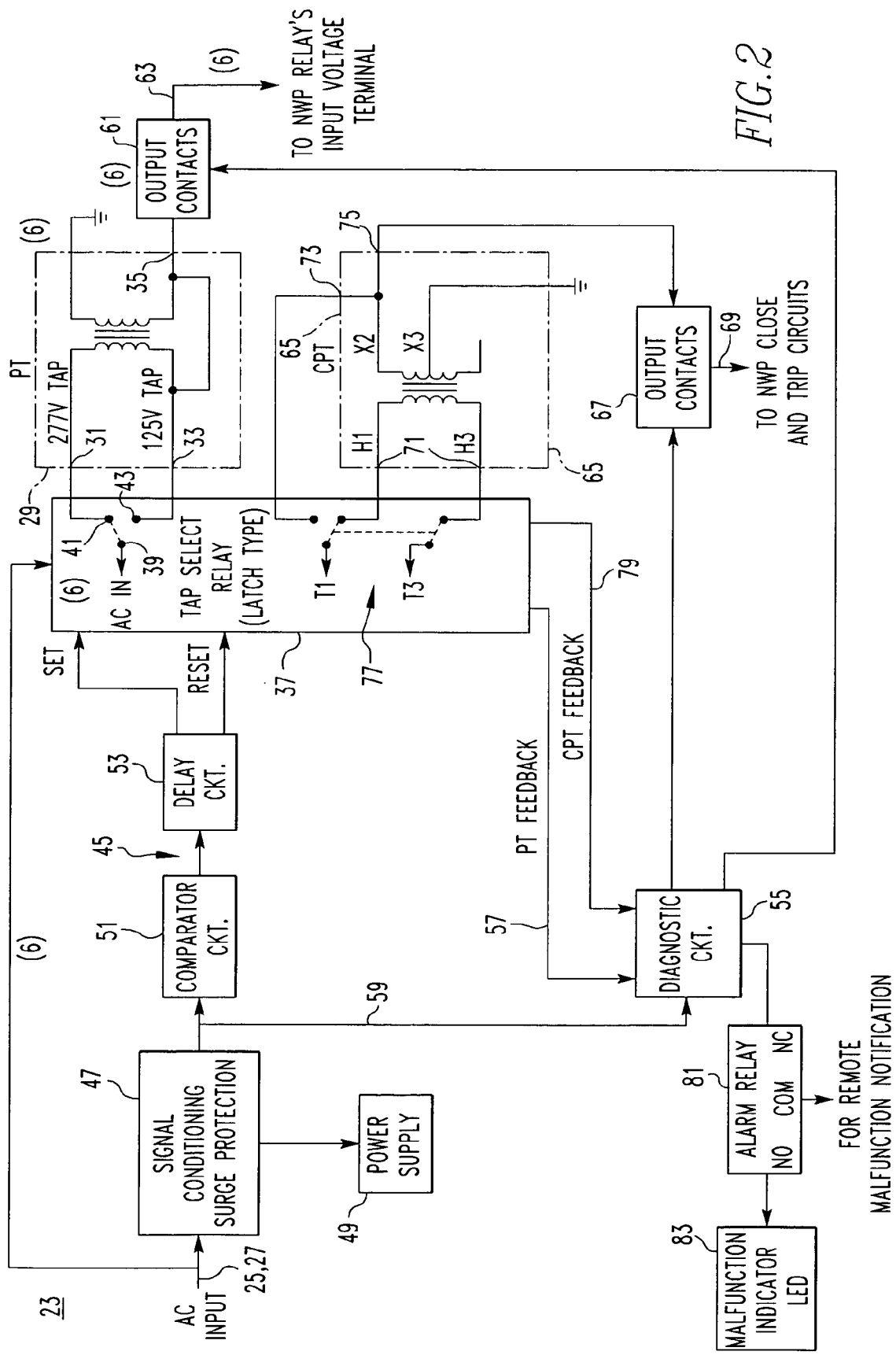
FIG. 2 is a schematic diagram of the voltage device which forms part of the network protector of FIG. 1.

FIG. 2 illustrates schematically the AVSD 23. The AVSD 23 includes six step down (PT) transformers 29, one for each of the three source phase voltages and the three network phase voltages. Each step down transformer 29 has a first input tap 31, a second input tap 33, and an output tap 35. These transformers convert a voltage of the first operating value applied to the first input tap and a voltage of the second operating value applied to the second input tap to a voltage of the third operating value at the output tap. Thus, in the exemplary network protector the 277 volt source and network phase voltages are applied to the first input tap 31 and the 125 voltages are applied to the second input tap 33 to produce scaled voltages with a nominal value of 125 volts at the output tap 35. An input switch device in the form of a tap select relay 37 comprises six input switches 39 each associated with one of the step down transformers 29. Each of the input switches 39 has a normally closed contact 41 connected to the first input tap 31 of the associated step down transformer and a normally open contact 43 connected to the second input tap 33 of the step down transformer. Each of the switches 39 has its input connected to receive one of the three source phase voltages or network phase voltages provided by on the leads 25, 27.

The input switches 39 of the tap select relay 37 are controlled by a control circuit 45 that includes a signal conditioning and surge protection module 47 that converts the source and network phase voltages to control level voltages, for example, 0–5 volts. A power supply 49 provides a regulated supply voltage for the AVSD. The control circuit 45 includes a comparator circuit 51 that compares each of the source phase voltages and network phase voltages to a reference voltage. This reference voltage is selected so that it is below the first operating value but above the second operating value, and is about 189 volts in the exemplary network protector. If all of the phase voltages are below the reference voltage, the comparator generates a signal to operate the input switches 39. A delay circuit delays setting of the input switches for a period such as, for example, two seconds to allow the phase voltages to settle down, for instance, following power on. The input switches 39 are of the latching type so that they maintain their state until operated again by the control circuit 45. This is important in that the system voltage can sag and swell, which could cause spurious operation of the AVSD 23. For instance, the network protector relay 18 is required to be able to operate when the system voltage sags as much as 7.5 percent of the nominal voltage (down to about 9 volts on the 125 volt system and about 20 volts on the 277 volt system). It should also be noted that the input switches default to the 277 volt tap through the normally closed contacts 41, so that on start-up the source and network phase voltages are applied to the first input taps of all of the step down transformers 29.

The control circuit 45 incorporates a diagnostic circuit 55. This circuit receives feedback over the lines 57 from the input switches 39 indicating the position of each of the input switches 39 and the voltage at the normally open contact 43. The diagnostic circuit 55 also receives the signals representing the three source and three network phase voltages over the leads 59. The diagnostic circuit 55 determines whether the position of the switches 39 is correct by correlating the phase voltages with switch position. By checking that the voltage at the normally open contact 43 is below about 95 volts in the exemplary system, the diagnostic circuit 55 assures that phase voltages above about 185 volts are not being output by the step down transformers. If the input switches 39 are all in the proper position and the output voltage on the step down transformers is not above about 185 volts, the diagnostic circuit 55 operates a set of output switching device or contacts 61 to apply the scaled source and network phase voltages to the network protector relay 19 over the leads 63.

The AVSD 23 also includes a control step down transformer (CPT) 65 that provides power to the NWP trip/close control circuit 17 in the circuit breaker 13 through closing output control switch or contacts 67 over leads 69. The control transformer 65 has a pair of first input taps 71, a second input tap 73, and an output tap 75. A double throw input control switch 77 in the tap select relay 37 connects the first input taps 71 of the control transformer 65 across two phases, T1 and T3 of the source voltage, in the default position. For a 480 volt distribution system this puts 480 volts across the input taps 71 of the transformer 65, which converts it to 125 volts at the output terminal 75. When the comparator circuit 51 detects that the source and network phase voltages are at the second operating value, e.g., 125 volts, the upper contacts of the control input switch 77 apply the 125 volts directly to the output 75 of the transformer 65 and the lower contact of the switch 77 is disconnected.

The diagnostic circuit 55 also receives feedback from the CPT transformer 65 over the lead 79. If the switch 77 is in the proper position for the operating value of the source and network phase voltages and the voltage at the transformer 65 is compatible, the output contacts 67 are closed to provide power to the circuit breaker.

The diagnostic circuit 55 also generates alarms if any of the switches are in the wrong position or the incorrect voltages are being output. The fault activates an alarm relay 81 which in turn energizes a malfunction light emitting diode (LED) 83. The alarm relay has normally open (NO) and normally closed (NC) contacts and a common (COM) output for providing remote malfunction notification.

Figure 3:
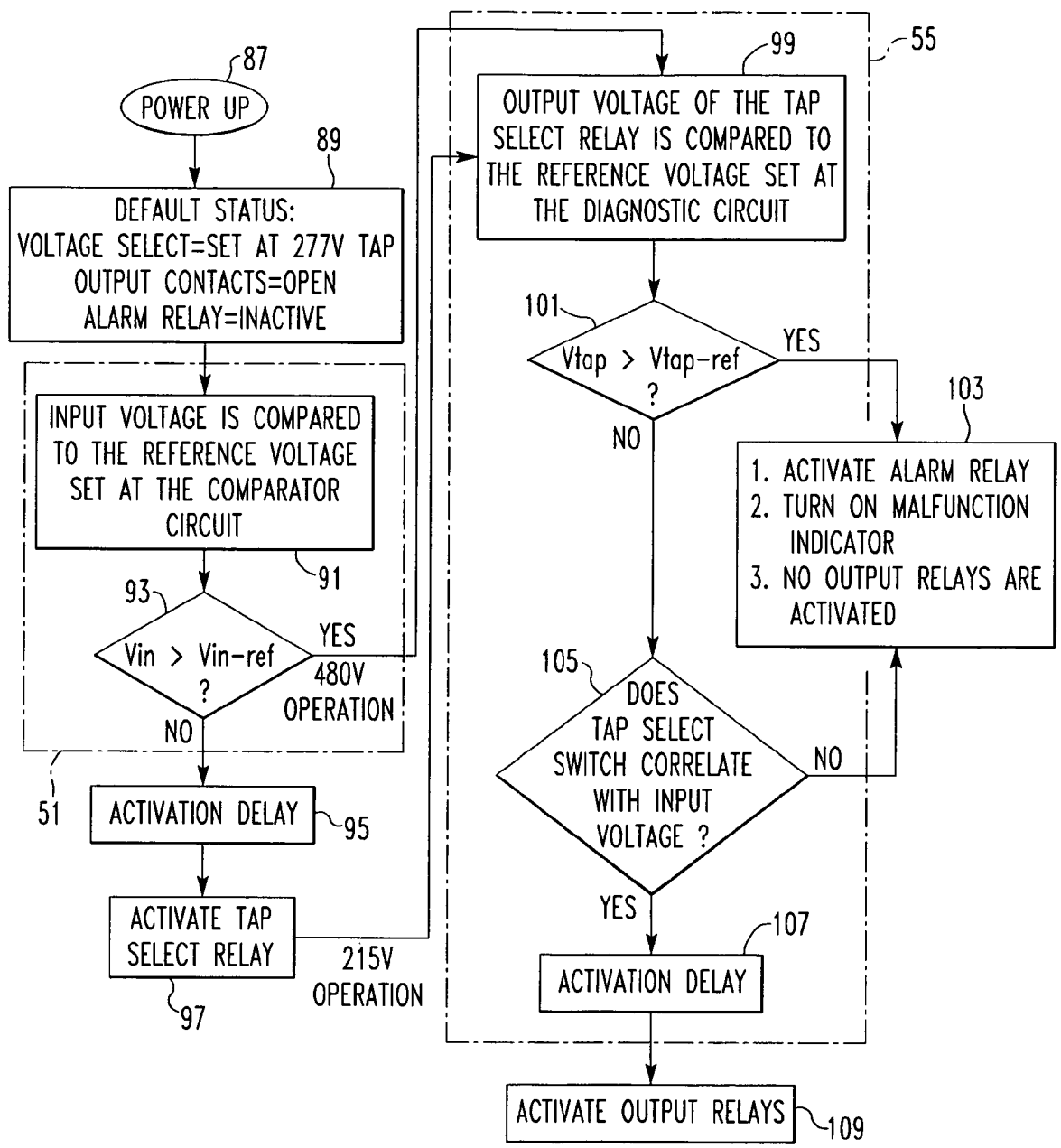
FIG. 3 is a flow chart illustrating operation of the voltage device of FIG. 2.

FIG. 3 is a flow diagram of the logic 85 implemented by the AVSD 23. Upon power up at 87 the AVSD defaults at 89 to set the tap select relay 37 at the 277 voltage tap so that regardless of the operating voltage of the distribution system to which the AVSD is connected, the voltages provided to the network protector relay 19 and the trip/close control circuit 17 of the circuit breaker will not exceed the operating ranges of these devices. In addition, the output contacts 61 and 69 to the network protector relay and the trip/close control circuit, respectively, are both opened. Also, the alarm relay is set to inactive status. The comparator circuit 51 then compares the source and network phase voltages to the reference voltage at 91. If these system phase voltages are all less than the reference voltage as determined at 93, indicating that the operating voltage of the distribution system is the lower value, or 216 volts in the exemplary case, the delay circuit 53 is activated at 95. This delay, which is two seconds in the exemplary AVSD, allows the AVSD to stabilize and avoids switching to the lower operating voltage in error. Upon expiration of the delay interval, tap select relay 37 is activated at 97 to switch the input switches 39 to apply the source and network voltages to the second input taps 33 of the six step down transformers 29. If the source and network phase voltages exceed the reference voltage at 93, no switching action is required as the default setting applies the system voltages to the first input taps 41 of the step down transformers 29.

Once the setting of the tap select relay has been established, the diagnostic circuit 55 checks the output voltages of the tap select relay at 99. As will be recalled, these feedback voltages from the step down transformers are taken from the second input tap 33, and therefore, should never exceed about 185 volts because the voltage would be about 84 volts if the first input tap were selected. Hence, if at 101 this feedback voltage, Vtap, exceeds the reference voltage set at about 185 volts but below 410, there is a malfunction such as welded contacts or inappropriate switching, and therefore, action is taken at 103 to activate the alarm relay 81, turn on the malfunction indicator 83 and block activation of the output relays 61 and 69.

The diagnostic circuit 55 also checks at 105 whether the tap select switch is in the proper position for the input voltage. If not, again appropriate action is taken at 103. On the other hand, if the feedback voltage is correct and the tap select switch is in the proper position, a delay is initiated at 107, again to assure stabilized conditions, and then the output relays 61 and 67 are activated at 109.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A network protector protecting a network having three network phase voltages at a connection to a source having three source phase voltages, all of which may have first or second operating values, the network protector comprising:
   a circuit breaker selectively connecting the three network phase voltages to the three source phase voltages;
   a network protector relay controlling operation of the circuit breaker in response to three scaled source phase voltages and three scaled network phase voltages corresponding to and having a third operating value proportional to the three source phase voltages and the three network phase voltages, respectively; and
   a voltage device automatically generating from the three source phase voltages and the three network phase voltages having either the first or second operating values, the three scaled source phase voltages and the three scaled network phase voltages proportional to the three source phase voltages and the three network phase voltages and having the third operating value.

2. The network protector of claim 1, wherein the first operating value is more than a second operating value and the third operating value substantially equals the second operating value.

3. The network protector of claim 1, wherein the voltage device comprises:
   step down transformer means having first input taps, second input taps, and output taps converting source phase voltages and the network phase voltages having the first operating value connected to the first input taps into the scaled source phase voltages and scaled network phase voltages at the output taps having the third operating value, and converting source phase voltages and the network phase voltages having the second operating value applied to the second input taps into the scaled source phase voltages and scaled network phase voltages at the output taps, having the third operating value,
   an input switch device selectively connecting the three source phase voltages and the three network phase voltages to one of the first input taps and the second input taps; and
   control circuit determining the operating value of the three source phase voltages and the three network phase voltages and operating the input switch device to connect the three source phase voltages and the three network phase voltages to the second input taps when all the source phase voltages and all the network phase voltages have the second operating value and to the first input taps otherwise.

4. The network protection of claim 3, wherein the control circuits further comprises a delay circuit delaying switching of the input switch device for a time interval after power up.

5. The network protector of claim 4, wherein the input switch device comprises a latching switch device that maintains connection of the source phase voltages and the network phase voltages to the input taps of the step down transformer means until operated by the control circuit.

6. The network protector of claim 5, wherein the step down transformer means comprises six step down transformers each having a first input tap, a second input tap and an output tap, and wherein the input switch device comprises six input switches each connecting one of the three source phase voltages and three network phase voltages to one of the six step down transformers.

7. The network protector of claim 3, wherein the control circuit further comprises an output switching device between the output taps and the network protector relay, and a diagnostic circuit monitoring the scaled source phase voltages and the scaled network phase voltages and operating the output switching device to connect the output taps to the network protector relay only when all the scaled source phase voltages and scaled network phase voltages are of the third operating value.

8. The network protector of claim 7, wherein the diagnostic circuit monitors operation of the input switch device and the three source phase voltages and three network phase voltages and operates the output switching device to connect the output taps to the network protector relay only when the input switch device is in a position compatible with the operating values of the three source phase voltages and three network phase voltages.

9. The network protector of claim 7, wherein the first operating value is greater than the second operating value and the third operating value is substantially equal to the second operating value.

10. The network protector of claim 3, wherein the voltage device further comprises a control step down transformer having a first input tap and a second input tap and an output tap converting a voltage of the first operating value applied to the first input tap and a voltage of the second operating value applied to the second input tap to a control voltage of a fourth operating value at the output tap for operating the circuit breaker, an input control switch selectively connecting one of the three source phase voltages and the three network phase voltages to one of the first input tap and the second input tap of the control step down transformer and the control circuit operating the input control switch to connect the one of the three source phase voltages and network phase voltages having the first operating value to the first input tap of the control step down transformer and to connect the one of the three source phase voltages and three network phase voltages having the second operating value to the second input tap of the control step down transformer.

11. The network protector of claim 10, wherein the voltage device further includes an output control switch and a diagnostic circuit monitoring the control voltage and closing the output control switch only when the control voltage has the fourth operating value.

12. The network protector of claim 11, wherein the fourth operating value substantially equals the third operating value.

13. The network protector of claim 12, wherein the first operating value is greater than the second operating value and the third and fourth operating values are substantially equal to the second operating value.

14. The network protector of claim 11, wherein the diagnostic circuit monitors operation of the input control switch and closes the output control switch only when the position of the input control switch is compatible with the operating value of the one of the three source phase voltages and the three network phase voltages.

15. A voltage device for automatically generating for a network protector relay scaled source phase voltages and scaled network phase voltages from source phase voltages and network phase voltages of a three phase power distribution system that can have either a first operating value or a second operating value, the voltage device comprising:

six step down transformers each having a first input tap, a second input tap, and an output tap and each converting a voltage of the first operating value applied to the first input tap and a voltage of the second operating value applied to the second input tap into a voltage of the third operating value at the output tap;

six input switches selectively connecting one of the three source phase voltages or one of the three network phase voltages to the first input tap or the second input tap of one of the six step down transformers; and a control circuit determining the operating value of the three source phase voltages and three network phase voltages and operating the six input switches to connect the three source phase voltages and the three network phase voltages to the second input taps when all of the three source phase voltages and three network phase voltages have the second operating value and to the first input taps otherwise.

16. The voltage device of claim 15, wherein the first operating value is greater than the second operating value and the third operating value is substantially equal to the second operating value.

17. The voltage device of claim 15, wherein the input switches are latching relays that maintain connection of the three source phase voltages and three network phase voltages to one of the first and second input taps of the step down transformers until the control circuit changes the selection.

18. The voltage device of claim 15, wherein the control circuit further comprises a delay circuit delaying switching of the six input switches for an interval after power up.

19. The voltage device of claim 15, wherein the control circuit further comprises a comparator comparing the three source phase voltages and three network phase voltages with a reference voltage that is less than the first operating value but greater than the second operating value and operating the six input switches to connect the three source phase voltages and three network phase voltages to the second input taps of the six step down transformers only when the three source phase voltages and three network phase voltages are less than the reference voltage.

20. The voltage device of claim 19, wherein the control circuit further comprises a delay circuit delaying operation of the six input switches for a selected interval after a change in output of the comparator.

* * * * *